(12) United States Patent
Golsch (10) Patent No.: US 10,864,888 B2
(45) Date of Patent: Dec. 15, 2020

(54) SYSTEMS AND METHODS FOR ACTIVATING VEHICLE FUNCTIONS

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 0 days.

(21) Appl. No.: 16/786,387

(22) Filed: Feb. 10, 2020

(65) Prior Publication Data

US 2020/0298800 A1  Sep. 24, 2020

Related U.S. Application Data

(60) Provisional application No. 62/821,479, filed on Mar. 21, 2019.

(51) Int. Cl.
| | |
|---|---|
| *B60R 25/24* | (2013.01) |
| *H04W 4/021* | (2018.01) |
| *H04W 4/02* | (2018.01) |
| *B60R 25/20* | (2013.01) |
| *H04W 12/12* | (2009.01) |
| *H04W 88/16* | (2009.01) |

(52) U.S. Cl.
CPC ............ *B60R 25/24* (2013.01); *B60R 25/209* (2013.01); *H04W 4/021* (2013.01); *H04W 4/027* (2013.01); *H04W 12/1201* (2019.01); *B60R 2325/108* (2013.01); *H04W 88/16* (2013.01)

(58) Field of Classification Search
CPC ...... B60R 25/24; B60R 25/209; H04W 4/021; H04W 4/027
USPC ....................................................... 455/456.1
See application file for complete search history.

(56) References Cited

U.S. PATENT DOCUMENTS

| | | |
|---|---|---|
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |

(Continued)

FOREIGN PATENT DOCUMENTS

| | | |
|---|---|---|
| BR | 102014017465 A2 | 2/2016 |
| CN | 104574593 A | 4/2015 |

(Continued)

*Primary Examiner* — Joel Ajayi
(74) *Attorney, Agent, or Firm* — Harness, Dickey & Pierce, P.L.C.

(57) ABSTRACT

Systems and methods are provided and include a processor configured to execute instructions stored in a computer-readable medium. The instructions include determining whether movement data associated with a user device and location data associated with the user device indicates that the user device is approaching a first location, determining whether the location data matches the movement data and a measured signal strength associated with at least one sensor of a vehicle, wherein the measured signal strength indicates a signal strength of a communication link between the user device and a control module of a vehicle, and determining that the user device is approaching the first location in response to a determination that the location data matches the movement data and the measured signal strength.

12 Claims, 8 Drawing Sheets

(56) References Cited

U.S. PATENT DOCUMENTS

| | | |
|---|---|---|
| 10,244,476 B2 | 3/2019 | Elangovan et al. |
| 10,328,898 B2 | 6/2019 | Golsch et al. |
| 10,328,899 B2 | 6/2019 | Golsch |
| 10,328,900 B1 | 6/2019 | Yakovenko et al. |
| 2011/0215921 A1 | 9/2011 | Ben Ayed et al. |
| 2012/0045058 A1 | 2/2012 | Weghaus |
| 2014/0274013 A1 | 9/2014 | Santavicca |
| 2015/0148989 A1 | 5/2015 | Cooper et al. |
| 2015/0161832 A1 | 6/2015 | Esselink et al. |
| 2015/0310681 A1 | 10/2015 | Avery et al. |
| 2015/0356797 A1 | 12/2015 | McBride et al. |
| 2016/0150407 A1 | 5/2016 | Michaud et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0056936 A1* | 3/2018 | Parasurama ........ B60R 25/1012 |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

* cited by examiner

SYSTEMS AND METHODS FOR ACTIVATING VEHICLE FUNCTIONS

CROSS-REFERENCE TO RELATED APPLICATION

This application claims the benefit of U.S. Provisional Application No. 62/821,479, filed on Mar. 21, 2019. The entire disclosure of the above application is incorporated herein by reference.

FIELD

The present disclosure relates to systems and methods for activating vehicle functions.

BACKGROUND

This section provides background information related to the present disclosure and is not necessarily prior art.

Traditionally, a passive entry/passive start (PEPS) system, which is a vehicle system that includes a keyless entry system, allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the key fob. If the key fob is authenticated and is located within an authorizing zone, the vehicle's function is made available to the user (e.g., doors are unlocked or vehicle is started).

Traditionally, PEPS systems use proprietary grade radio protocols using low frequency (LF) signals of approximately 125 kHz. PEPS systems are also hampered by the physics of the LF systems. LF was selected by early PEPS systems, because the wave propagation allows for relatively accurate estimation of range and location by using signal strength within the typical target activation range of 2 meters. However, due to the extremely long wavelength of the LF signal compared to the size of a practical vehicle antenna and key fob receiver, it is difficult within reasonable power consumption and safe transmit power levels to reliably communicate with a key fob using LF beyond a few meters. Consequently, it is difficult to make any of the vehicle's functions available to the user when the key fob is located more than a few meters away from the vehicle.

Accordingly, key fobs are being implemented by smart devices, such as smartphones and wearable devices, wherein the smart devices are able to communicate at a range greater than the activation range of LF systems. As such, smart devices enable the availability of various vehicle functions and long range distancing features, such as passive welcome lighting, distance bounding on remote parking applications, and so on.

However, traditional PEPS systems and PEPS systems with key fobs that are implemented by smart devices include wireless vulnerabilities that may subject the respective PEPS systems to malicious attacks. As an example, a user may attack a PEPS system by passive eavesdropping, man-in-the-middle (MITM) attacks, and identity tracking of various telemetric links of the PEPS system.

SUMMARY

This section provides a general summary of the disclosure, and is not a comprehensive disclosure of its full scope or all of its features.

A system is provided and includes a processor configured to execute instructions stored in a computer-readable medium. The instructions include determining whether movement data associated with a user device and location data associated with the user device indicates that the user device is approaching a first location, determining whether the location data matches the movement data and a measured signal strength associated with at least one sensor of a vehicle, wherein the measured signal strength indicates a signal strength of a communication link between the user device and a control module of a vehicle, and determining that the user device is approaching the first location in response to a determination that the location data matches the movement data and the measured signal strength.

A method is also provided and includes determining, using a processor that is configured to execute instructions stored in a computer-readable medium, whether movement data associated with a user device and location data associated with the user device indicates that the user device is approaching a first location. The method also includes determining, using the processor, whether the location data matches the movement data and a measured signal strength associated with at least one sensor of a vehicle, wherein the measured signal strength indicates a signal strength of a communication link between the user device and a control module of a vehicle. The method also includes determining, using the processor that the user device is approaching the first location in response to a determination that the location data matches the movement data and the measured signal strength.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol based on the standardized specification of the Bluetooth Consortium. Specifically, the present disclosure relates to a PEPS system using a Bluetooth Low Energy (BLE) communication protocol for communication between the vehicle and a BLE-enabled user device, such as a smartphone or a wearable device. The PEPS system can include a sensor network that may be configured to find existing connections between the user device and the vehicle and to measure the timing and signal characteristics of the communication between the user device and the vehicle. In other embodiments, the PEPS system can include one or more sensors configured to send or receive signals, such as broadcast signals over open advertising channels, to or from a user device. Further, the PEPS system also includes a central module that collects received signal strengths measured by the sensor network, and based on the received signal strengths, the central module may determine the distance between the user device and the vehicle.

Further, the PEPS system may obtain movement data associated with the user device, location data of the user device, and/or velocity data of the user device. Based on the movement data, location data, velocity data, and/or signal strengths, the PEPS system is configured to determine whether the user is approaching the vehicle. In response to a determination that the user is approaching the vehicle, the PEPS system determines the distance between the vehicle and the user device and may make certain vehicle functions available to the user based on the determined distance.

Figure 1:
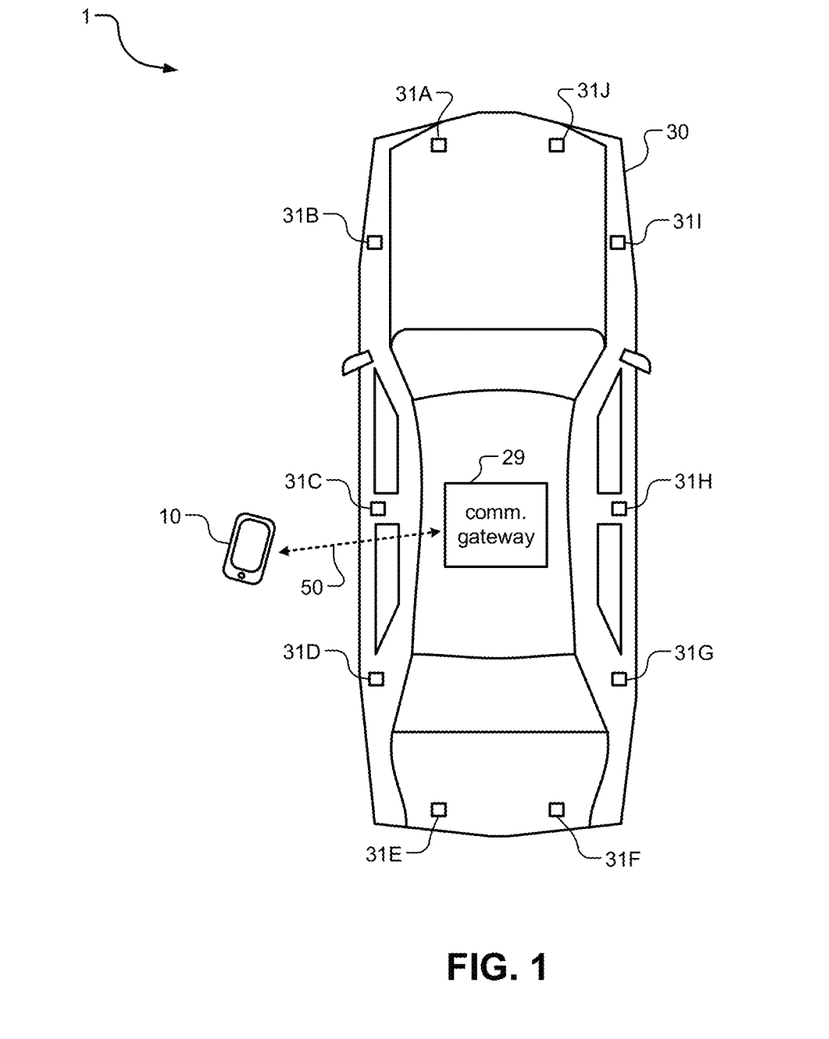
FIG. 1 illustrates a subject vehicle with a PEPS system according to the present disclosure.
Figure 2:
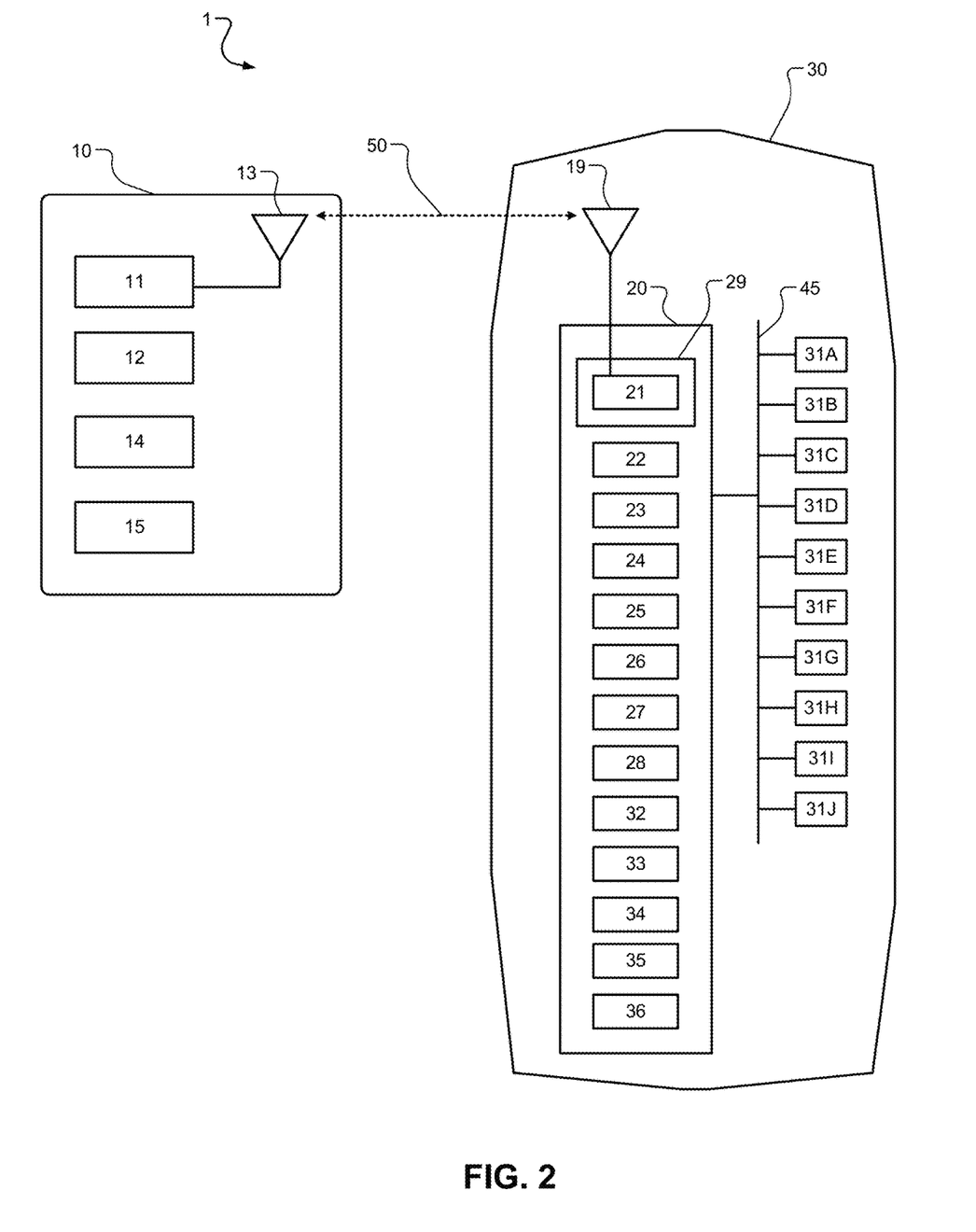
FIG. 2 illustrates a functional block diagram of a PEPS system according to the present disclosure.

With reference to FIGS. 1-2, a PEPS system 1, which may also be referred to as a localization system, is provided within a vehicle 30 and includes a communication gateway 29 and a plurality of sensors 31A-31J, referred to collectively as sensors 31. The PEPS system 1 includes one or more control modules 20 that are distributed throughout the vehicle 30 and are able to communicate with each other through, for example, a vehicle interface 45. In addition, some of the modules may be integrated into a single electronic control unit (ECU) and are able to communicate with each other using the vehicle interface 45. The vehicle interface 45, for example, may include a controller area network (CAN) bus for communication between main modules and/or lower data rate communication such as local interconnect network (LIN) for communication between the sensors 31. The vehicle interface 45 can also include a clock extension peripheral interface (CXPI) bus. Additionally or alternatively, the vehicle interface 45 can include a combination of CAN bus, LIN, and CXPI bus communication interfaces. The structure of the sensors 31 are described below in further detail with reference to FIG. 3.

The control module 20 can include, for example, the communication gateway 29 that includes a BLE chipset 21 connected to an antenna 19. As shown in FIG. 2, the antenna 19 may be located in the vehicle 30. Alternatively, the antenna 19 may be located outside of the vehicle 30 or within the control module 20. The control module 20 can also include a link authentication module 22 that authenticates a user device 10 for communication via a communication link 50. The control module 20 can also include a data management layer 23 for push data. The control module 20 may also include a connection information distribution module 24. The control module 20 may also include a timing control module 25. The control module 20 can also include a telematics module 26, such as a global positioning system (GPS) module and/or other navigation or location modules. The control module 20 can also include a PEPS module 27. The control module 20 can also include a body control module 28. The control module 20 can also include a sensor processing and localization module 32. The control module 20 can also include a security filtering module 33. The control module 20 may also include one or more processors that are configured to execute instructions stored in a computer-readable medium, such as a read-only memory (ROM) and/or random access memory (RAM).

As shown in FIGS. 1-2, the user device 10 can communicate with the communication gateway 29 of the vehicle 30 via the communication link 50. Without limitation, the user device 10 may be any Bluetooth enabled communication device, such as a smart phone, smart watch, wearable electronic device, key fob, tablet device, or other device associated with a user of the vehicle 30, such as an owner, driver, passenger of the vehicle 30, and/or a technician for the vehicle 30. The user device 10 can include a BLE chipset 11 connected to an antenna 13. The user device 10 can also include application software 12 stored in a computer-readable medium, such as a read-only memory (ROM) or a random-access memory (RAM). Further, the application software 12 includes instructions that are executable by a processor of the user device 10. The user device 10 can also include a GPS module 14 or other device location service. The user device 10 may also include an accelerometer 15. The GPS module 14 and the accelerometer 15 are described below in further detail with reference to FIGS. 5A-5B.

The user device 10 and the communication gateway 29 may establish the communication link 50 using a Bluetooth communication link, as provided for and defined by the Bluetooth specification. For example, the communication link 50 between the user device 10 and the communication gateway 29 can be a BLE communication link.

The PEPS system 1 may be configured to provide additional authentication of the communication link 50 with the user device. For example, the communication gateway 29 can communicate with the link authentication module 22 to authenticate the user device 10 and establish the communication link 50. For example, the link authentication module 22 can be configured to implement challenge-response authentication. In such case, timing information about the communication between the communication gateway 29 and the user device 10 is sent to the timing control module 25, which communicates with the sensors 31 through the vehicle interface 45, as described below. Further, the communication gateway 29 can communicate information about how to receive signals from the user device 10, such as information about communication channels and channel switching parameters (collectively and hereinafter referred to as channel information), to the connection information distribution module 24. The communication gateway 29 can communicate the information regarding how to receive signals from the user device 10 (hereinafter receive signal information) to the sensors 31. For example, the connection information distribution module 24 can be configured to communicate with each of the sensors 31 using the vehicle interface 45 and to provide the sensors 31 with communication information necessary for the sensors 31 to find and then follow the communication link 50 once the sensors 31 are synchronized with the communication gateway 29.

While FIGS. 1-2 illustrate a PEPS system 1 with ten sensors 31A-31J, any number of sensors can be used. For example, the PEPS system can include seven, eight, nine, eleven, twelve, or more sensors. In this way, while the present disclosure provides an example utilizing ten sensors, additional or fewer sensors can be used in accordance with the present disclosure.

Figure 3:
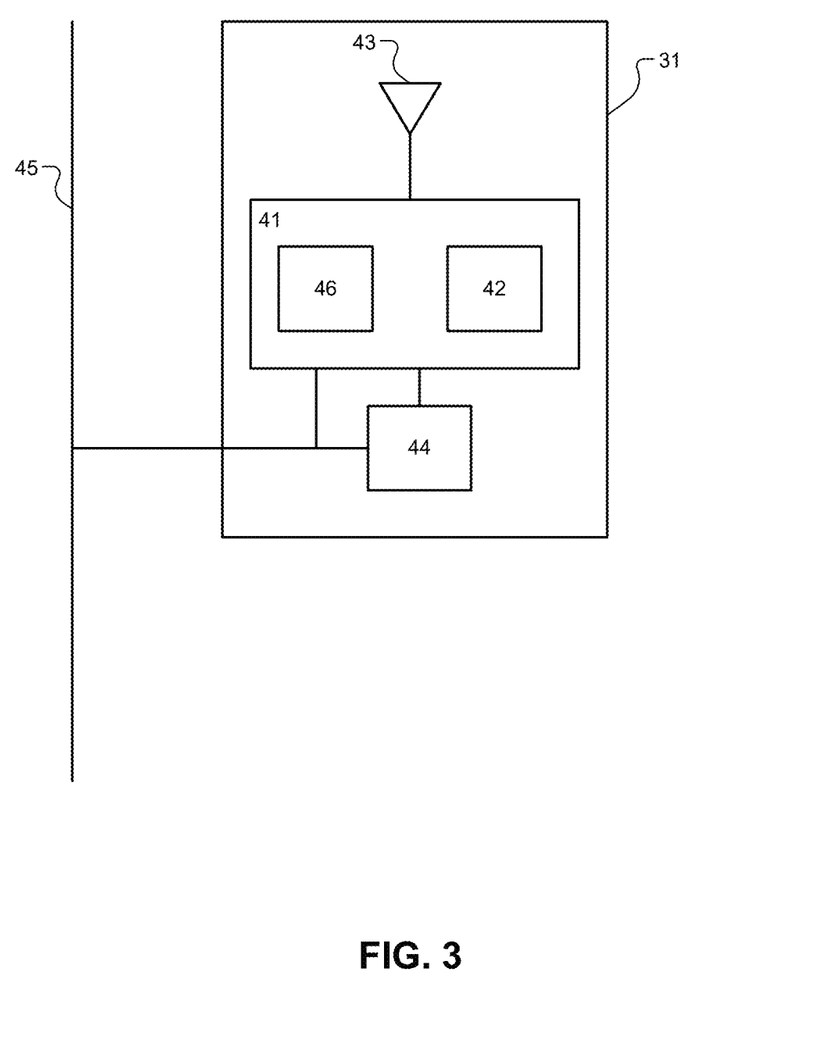
FIG. 3 illustrates a functional block diagram of a sensor of a PEPS system according to the present disclosure.

With reference to FIG. 3, each of the sensors 31 includes a BLE chipset 41 connected to an antenna 43. As shown in FIG. 3, the antenna 43 may be located internal to the sensors 31. Alternatively, the antenna 43 may be located external to the sensors 31. The sensors 31 receive BLE Signals using the antenna 43 and, specifically, receive BLE physical layer messages using a BLE physical layer (PHY) controller 46. The sensors 31 are configured to receive or eaves drop on communication packets sent by the user device 10 based on the information received from the communication gateway 29 about how to receive signals from the user device 10. For example, the sensors 31 are capable of observing BLE physical layer messages and taking measurements of the physical properties of the associated signals, including, for example, the received signal strength (RSSI) using the channel information and/or the receive signal information, as discussed above. Additionally or alternatively, the sensors 31 can determine other measurements of the physical properties of the associated signals, such as data related to the angle of arrival. Additionally or alternatively, the sensors 31 can communicate with each other and/or communicate with the communication gateway 29 via the vehicle interface 45 to determine time difference of arrival, time of arrival, or angle of arrival data for signals received by multiple sensors. As noted above, the sensors 31 receive timing information and the channel information and/or the receive signal information from the communication gateway 29 via the vehicle interface 45.

A timing synchronization module 44 is configured to accurately measure the reception times of messages on the vehicle interface 45 and pass the timing information to the BLE chipset 41. The BLE chipset 41 is configured to use the channel information and the receive signal information, received from the communication gateway 29, as discussed above, to tune the PHY controller 46 to a specific channel at a specific time and observe all physical layer messages and data that conform to the Bluetooth physical layer specification, which includes the normal data rates proposed or adopted, for example, in the Bluetooth Specification version 5.0. The data, timestamps and measured signal strength are reported by the BLE chipset 41 to the communication gateway 29 and/or control module 20 via the vehicle interface 45.

Figure 4:
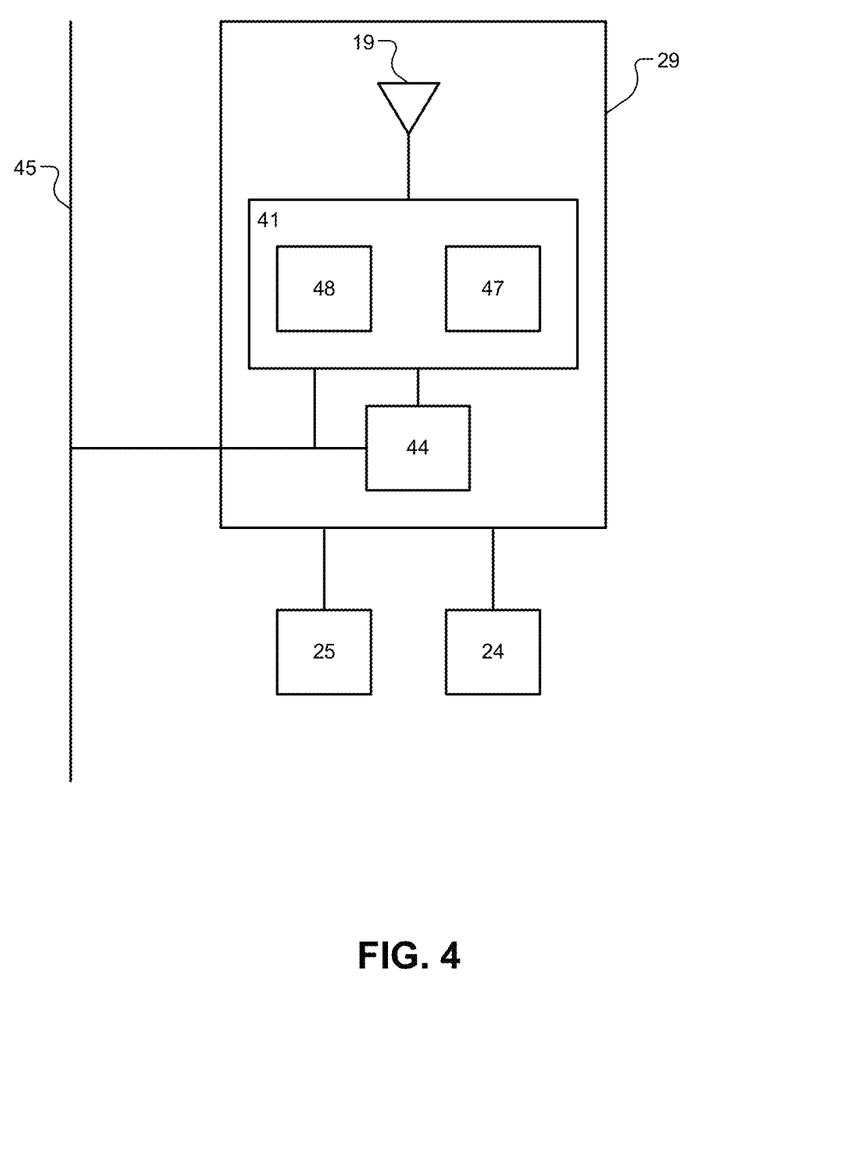
FIG. 4 illustrates a functional block diagram of a communication gateway of a PEPS system according to the present disclosure.

With reference to FIG. 4, the communication gateway 29 includes a BLE chipset 41 connected to an antenna 19 to receive BLE Signals. The BLE chipset 41 implements a Bluetooth protocol stack 48 that is, for example, compliant with the BLE specification, including, for example, version 5 of the BLE specification. The BLE chipset 41 also includes an application 47 implemented by application code stored in a computer-readable medium, such as a read-only memory (ROM) or a random-access memory (RAM).

With continued reference to FIG. 4, the communication gateway 29 is further configured to provide information about ongoing connections and timing signals necessary for each of the sensors 31 to find the connection being maintained by the communication gateway 29 with the user device 10, for example, and to subsequently follow the connection. The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the BLE chipset 41. The communication gateway 29 also includes a timing synchronization module 44. The timing synchronization module 44 is configured to accept the timing signals and works in conjunction with the vehicle interface 45 to create accurate time stamps of connection information messages and other communications.

Figure 5A:
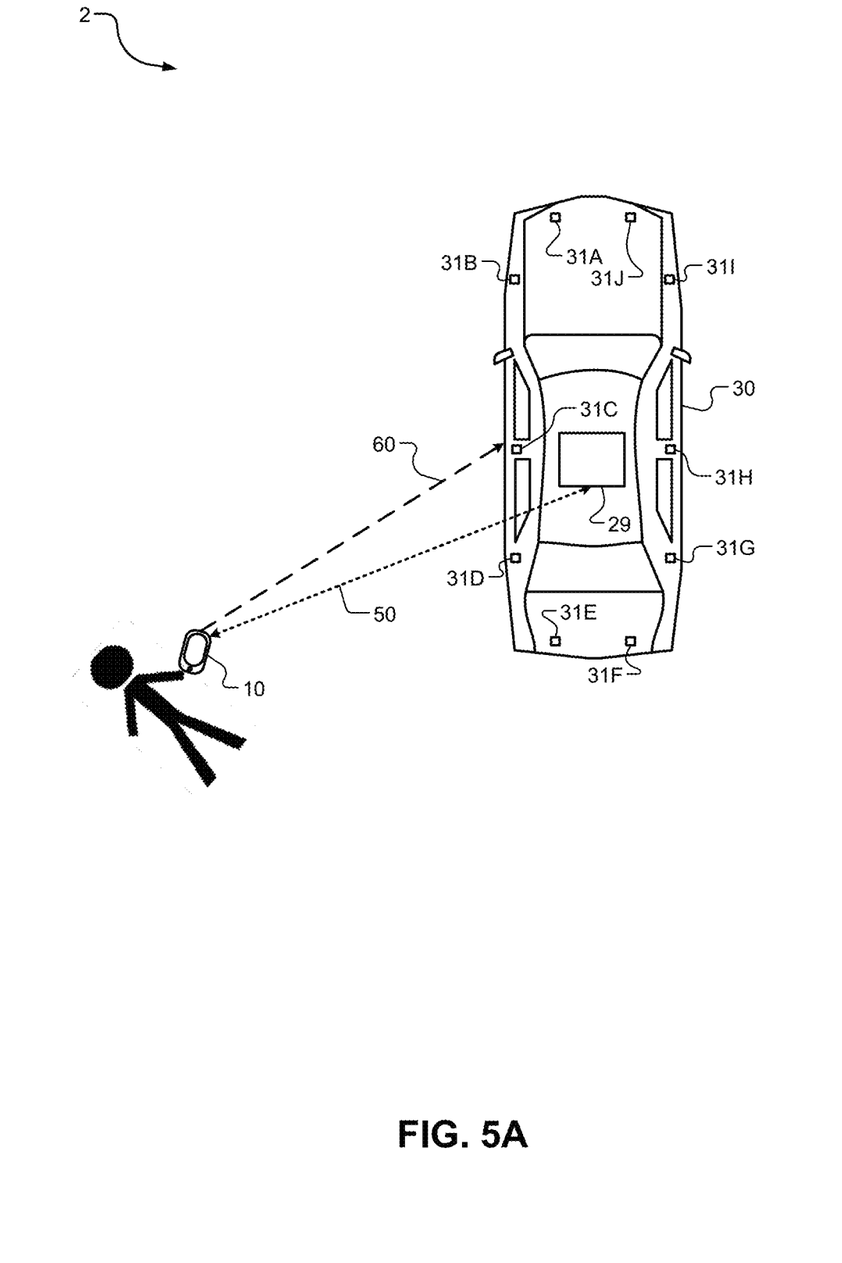
FIGS. 5A-5B illustrate a PEPS system according to the present disclosure.
Figure 5B:
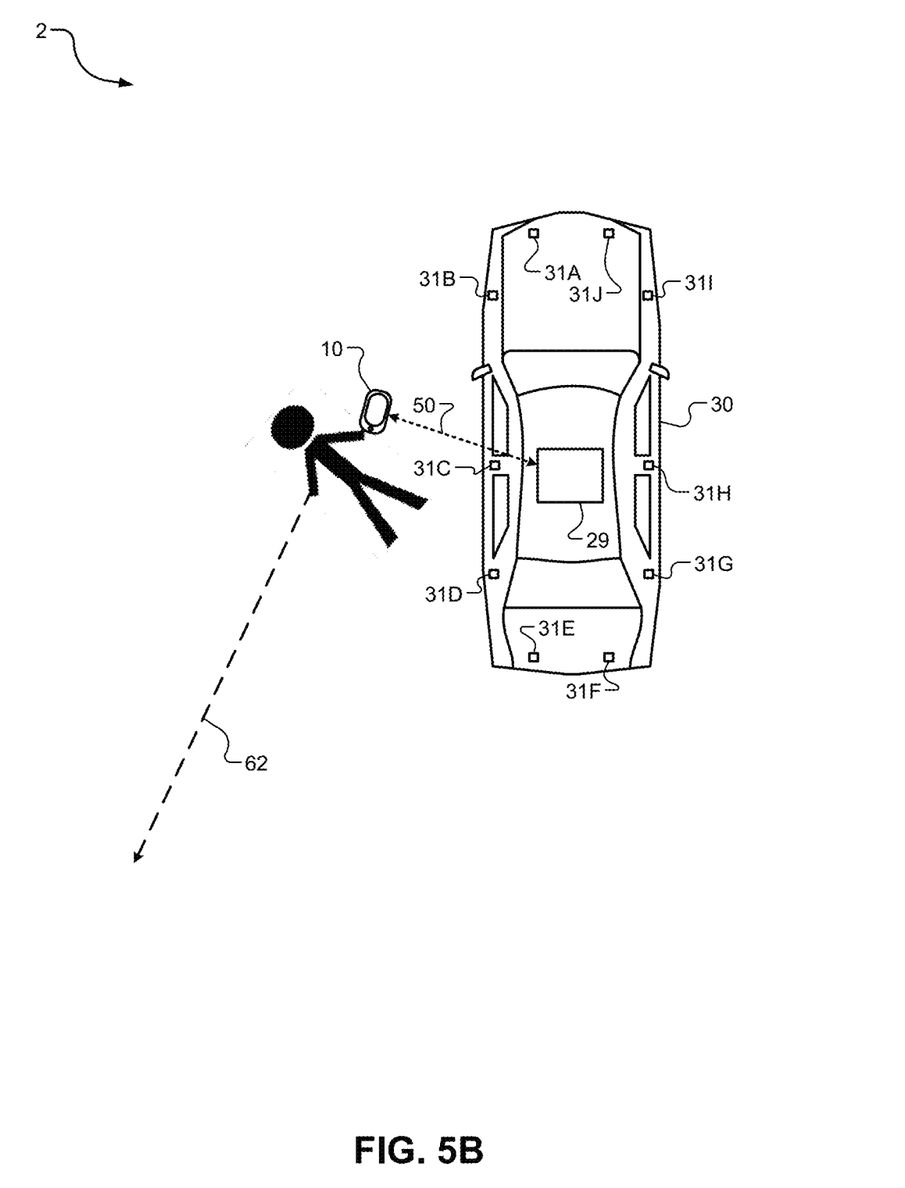

With reference to FIGS. 5A-5B, PEPS system 2 is shown. PEPS system 2 is similar to PEPS system 1 described above, but in this embodiment, the PEPS system 2 is configured to determine whether the user of the user device 10 is approaching the vehicle 30, as indicated by dashed arrow 60 in FIG. 5A. Additionally, the PEPS system 2 is configured to determine whether the user of the user device 10 is moving away from the vehicle 30, as indicated by dashed arrow 62 in FIG. 5B. Furthermore, the PEPS system 2 is configured to determine whether an unauthorized device is maliciously interfering with the communication link 50 and generating a signal indicating that the user of the user device 10 is approaching the vehicle 30 when the user is not approaching the vehicle 30.

In one embodiment, the PEPS system 2 is configured to generate movement data associated with the user device 10 using the accelerometer 15 of the user device 10. As an example, the accelerometer 15 may be configured to detect and generate signals corresponding to the movement of the user device 10. Based on the signals, the user device 10 is configured to generate movement data corresponding to a step length and/or step frequency of the user. Additionally or alternatively, in response to the accelerometer 15 generating signals corresponding to the movement, the user device 10 is configured to generate movement data corresponding to a type of movement the user of the user device 10. As an example, the user device 10 may be configured to determine whether the user is walking, jogging, running, standing, etc., based on the signals generated by the accelerometer 15. Additionally, the user device 10 may be able to determine whether the user device 10 is stationary, e.g., whether the the user device 10 is resting on, for example, a flat surface, such as a floor or table, based on the signals generated by the accelerometer 15.

Additionally, the PEPS system 2 is configured to generate location data associated with the user device 10 using the GPS module 14. Specifically, the GPS module 14 is configured to receive positioning and time information from a GPS satellite and subsequently generate signals representing the position and/or time data. Based on the signals representing the position and/or time data, the user device 10 is configured to generate information corresponding to the location of the user device 10. Additionally or alternatively, the user device 10 may be configured to determine a velocity of the user device 10 based a plurality of determined locations and a measurement time associated with each of the plurality of determined locations. In other embodiments, the user device 10 may transmit the signals representing the position and/or time data to the control module 20 via the communication link 50, and in response to receiving the signals, the control module 20 is configured to generate information corresponding to the location and/or velocity of the user device 10.

Additionally, the PEPS system 2 is configured to generate location data associated with the vehicle 30 using the telematics module 26. Specifically, the telematics module 26 is configured to receive positioning and time information from, for example, the GPS satellite and subsequently generate signals representing the position and/or time data. Based on the signals representing the position and/or time data, the control module 20 is configured to generate information corresponding to the location of the vehicle 30.

Additionally, the PEPS system 2 is configured to generate measurements indicative of the signal strength of the communication link 50 or the channel information and/or the receive signal information using the sensors 31 and the control module 20. Based on the measurements, such as the RSSI, time difference of arrival, time of arrival, or angle of arrival data for signals received by the sensors 31, the control module 20 may be configured to determine a distance between the user device 10 and the vehicle 30.

Based on the movement data, location data, velocity data, and/or signal strengths, which may be represented as a bit string that is generated by a fingerprinting algorithm executed by the user device 10 (i.e., a fingerprint), the PEPS system 2 is configured to determine whether the user of the user device 10 is approaching the vehicle 30 or moving away from the vehicle 30. While movement data, location data, velocity data, and/or signal strengths are used as a recognizable fingerprint for the user device 10, other identifying information of the user device 10 may additionally or alternatively be used. In response to a determination that the user is approaching the vehicle 30, the PEPS system 2 is configured to estimate the distance between the vehicle 30 and the user device 10 and may subsequently make certain vehicle functions available to the user based on the estimated distance, such as unlocking the doors of the vehicle 30 or starting the vehicle 30. Likewise, in response to a determination that the user is not approaching the vehicle 30, the PEPS system 2 is configured to refrain from making certain vehicle functions available to the user.

Moreover, the PEPS system 2 may be configured to detect potential malicious interference from an unauthorized device. As an example, the RSSI measurements may indicate that the user of the user device 10 is approaching the vehicle 30, but the location and/or velocity data of the user device 10 indicate that the user is moving away from the vehicle 30. In this instance, the PEPS system 2 may determine that an unauthorized device is attacking the communication link 50 and amplifying the signal being transmitted from the user device 10 to the vehicle 30 in order to, for example, unlock the door while the user walks away from the vehicle 30.

Figure 6:
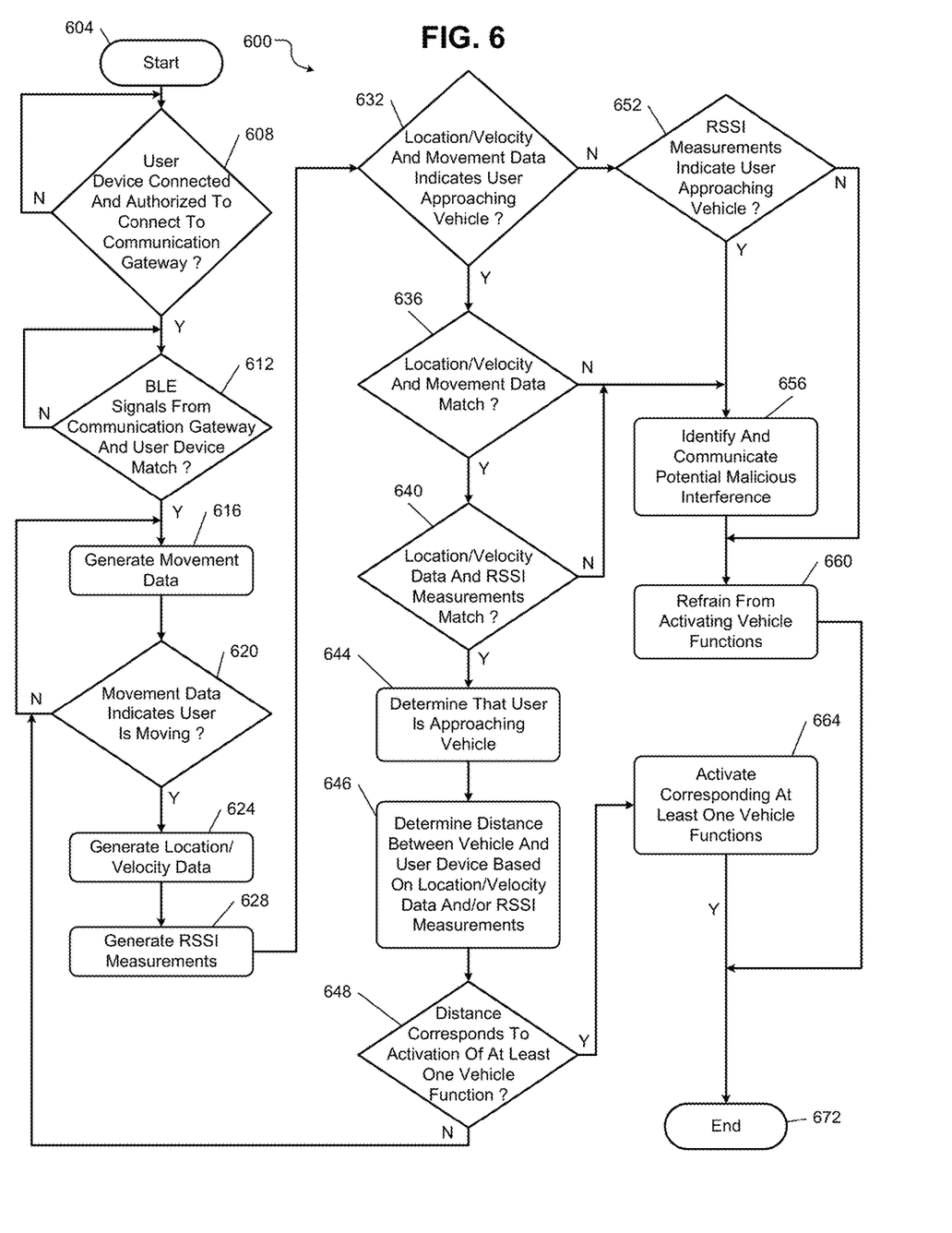
FIG. 6 illustrates a flowchart of a control algorithm according to the present disclosure.

With reference to FIG. 6, a flowchart illustrating an example control algorithm 600 representing an example decision based on a fingerprint of use cases is shown. The control algorithm 600 begins at 604 when, for example, the user turns on the user device 10. At 608, the control algorithm 600 determines, using the control module 20, whether the user device 10 is connected and authorized to connect to the communication gateway 29 via the communication link 50. As an example, the user device 10 may be authorized to connect to the communication gateway 29 in response to the link authentication module 22 successfully executing the challenge-response authentication. If the user device 10 is connected and authorized to connect to the communication gateway 29, the control algorithm 600 proceeds to 612; otherwise, the control algorithm 600 remains at 608 until the user device 10 is authorized to connect to and connected to the communication gateway 29. At 612, the control algorithm 600 determines whether the BLE signal received by the sensors 31 from the communication gateway 29 or control module 20 matches the BLE signals received by the sensors 31 from the user device 10. If so, the control algorithm 600 proceeds to 616; otherwise, the control algorithm remains at 612 until the BLE signal received by the sensors 31 from the communication gateway 29 matches the BLE signal received by the sensors 31 from the user device 10.

At 616, the control algorithm 600 generates, using a processor of the user device 10 that is configured to execute instructions stored in a computer-readable medium, movement data based on information obtained by, for example, the accelerometer 15 of the user device 10. At 620, the control algorithm 600 determines, using the processor of the user device 10, whether the movement data indicates that the user of the user device 10 is moving. In other embodiments, the control module 20 may receive the movement data from the user device 10 and subsequently execute step 620. If the movement data indicates that the user of the user device 10 is moving, the control algorithm 600 proceeds to 624; otherwise, the control algorithm 600 proceeds to 616. At 624, the control algorithm 600 generates, using the processor of the user device 10, location and/or velocity data using, for example, the GPS module 14. At 628, the control algorithm 600 generates, using the control module 20 and the sensors 31, RSSI measurements associated with the communication link 50 or the channel information and/or the receive signal information. In other embodiments, the control module 20 may generate the time difference of arrival, time of arrival, or angle of arrival data based on the information received by the sensors 31.

At 632, the control algorithm 600 determines, using the processor of the user device 10 or the control module 20, whether the location data and/or velocity data and the movement data indicates that the user of the user device 10 is approaching the vehicle 30. As an example, if the movement data indicates that the user is moving, and the location data and/or velocity data indicates that the user is approaching the location associated with the location data obtained by the telematics module 26 of the vehicle 30 (e.g., the user device 10 or the control module 20 may compare the GPS data of the user device 10 and the vehicle 30), the control algorithm 600 may determine that the user is approaching the vehicle 30. If the processor of the user device 10 or the control module 20 determines that the user is approaching the vehicle 30, the control algorithm 600 proceeds to 636; otherwise, the control algorithm 600 proceeds to 652.

At 652, the control algorithm 600 determines, using the processor of the user device 10 or the control module 20, whether the RSSI measurements indicate that the user is approaching vehicle 30. If so, the control algorithm 600 proceeds to 656; otherwise, the control algorithm 600 proceeds to 660. At 656, the control algorithm 600 identifies and communicates, using the user device 10 or the control module 20, potential malicious interference from an unauthorized device and then proceeds to 660. At 660, the control algorithm 600 refrains from activating certain vehicle functions (i.e., unlocking the door of the vehicle 30, starting the vehicle 30, etc.) and then proceeds to 672.

At 636, the control algorithm 600 determines whether the location and/or velocity data matches the movement data. As an example, if the movement data indicates that the user of the user device 10 is slowly approaching the vehicle 30, and the location and/or velocity data also indicates that the user of the user device 10 is slowly approaching the vehicle 30, the control algorithm 600 may determine that movement data and the location/velocity data match. As another example, if the movement data indicates that the user of the user device 10 is slowly approaching the vehicle 30, and the location and/or velocity data indicates that the user of the user device 10 is rapidly approaching the vehicle 30, the control algorithm 600 may determine that movement data and the location/velocity data do not match. If the control algorithm 600 determines that the movement data and the location/velocity data match, the control algorithm 600 proceeds to 640; otherwise, the control algorithm 600 proceeds to 656. While the above examples utilize specific types of data as a recognizable fingerprint for the user device 10, the above examples are not exhaustive and other types of data associated with the user device 10 can additionally or alternatively be used.

At 640, the control algorithm 600 determines, using the processor of the user device 10 or the control module 20, whether the location and/or velocity data matches the RSSI measurements. As an example, if the RSSI measurements indicate that the user of the user device 10 is approaching the vehicle 30, and if the location and/or velocity data also indicates that the user of the user device 10 is approaching the vehicle 30, the control algorithm 600 may determine that the location and/or velocity data and the RSSI measurements match. As another example, if the RSSI measurements indicate that the user of the user device 10 is approaching the vehicle 30, and the location and/or velocity data indicates that the user of the user device 10 is moving away from the vehicle 30, the control algorithm 600 may determine that the location and/or velocity data and the RSSI measurements do not match. If the control algorithm 600 determines that the location and/or velocity data and the RSSI measurements match, the control algorithm 600 proceeds to 644; otherwise, the control algorithm 600 proceeds to 656.

At 644, the control algorithm 600 determines, using the processor of the user device 10 or the control module 20, that the user of the user device 10 is approaching the vehicle 30. At 646, the control algorithm 600 determines, using the processor of the user device 10 or the control module 20, the distance between the vehicle 30 and the user device 10 based on the location data, velocity data, and/or RSSI measurements. At 648, the control algorithm 600 determines, using the processor of the user device 10 or the control module 20, whether the distance corresponds to the activation of at least one vehicle function (i.e., unlocking a door of the vehicle 30, starting the vehicle 30, etc.). If so, the control algorithm 600 proceeds to 664; otherwise, the control algorithm 600 proceeds to 616.

At 664, the control algorithm 600 activates, using the control module 20, the corresponding at least one vehicle functions and then proceeds to 672 and ends. The control algorithm 600 can be repeated, as needed, for the performance of additional vehicle functions, such as unlocking the vehicle doors, starting the vehicle, etc.

Figure 7:
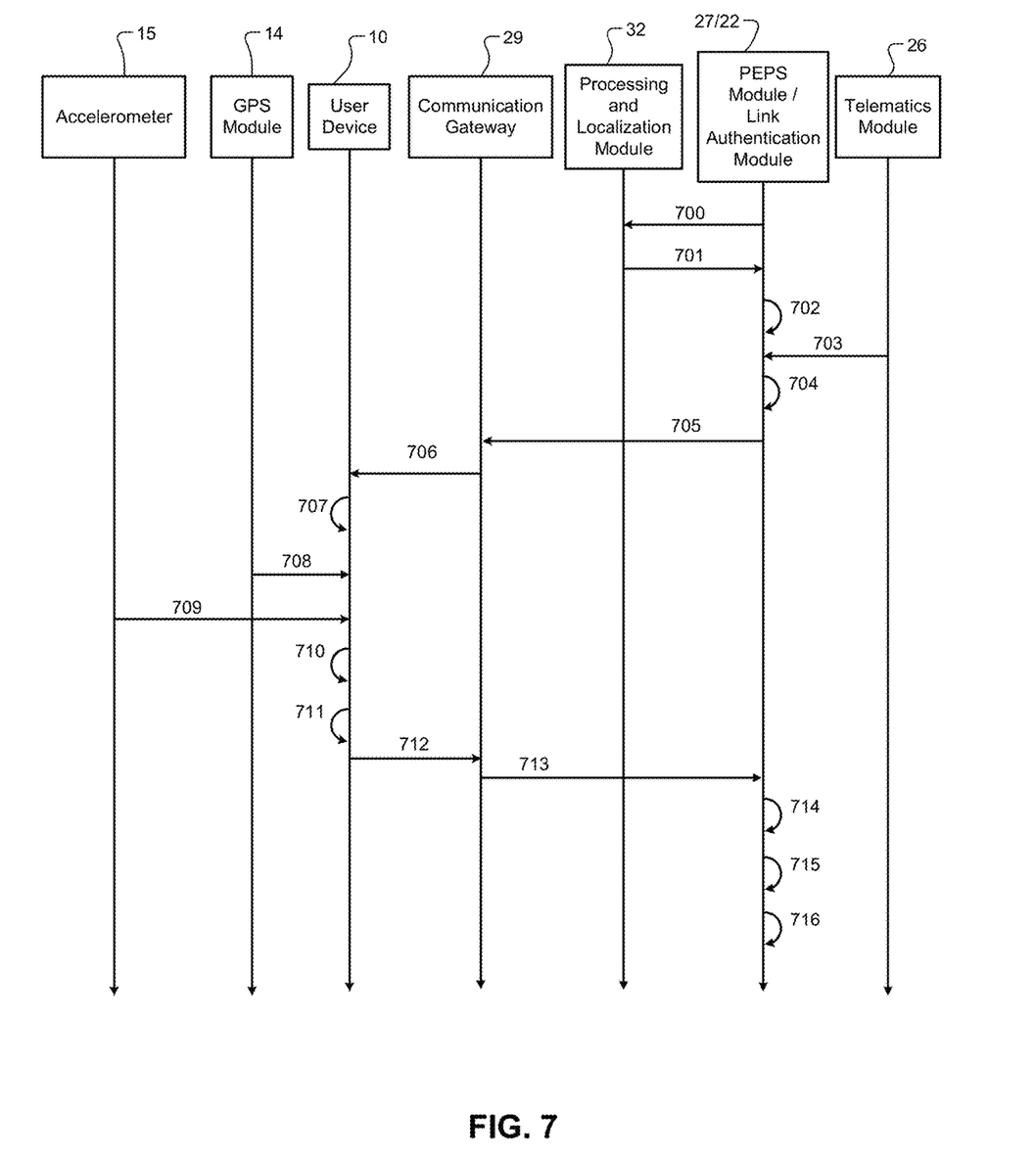
FIG. 7 illustrates an information communication method according to the present disclosure.

With reference to FIG. 7, an information communication method 700 is shown. The information communication method 700 may be activated by a user action detected by the vehicle 30, as described above with reference to FIGS. 1-2. As an example, the PEPS module 27 may make a determination regarding secure access to various vehicle functions based on the location of the user device 10 and the security information that the user device 10 can provide. For example, a challenge-response mechanism can be used, similar to current PEPS systems implemented using LF and RF systems.

The PEPS module 27 detects an intent to access a vehicle feature by way of a sensor. The PEPS module 27 then maps the request to a zone ID and sends a request 700 to the processing and localization module 32 to determine whether any user device 10 is within a zone ID of the vehicle 30. The processing and localization module 32 responds to the PEPS module 27 with response 701 indicating a list of user devices that are localized in a region that could have access to the vehicle feature corresponding to the zone ID. At 702, the PEPS module 27 checks the list of user devices to determine if the devices are paired with the system. For each valid user device 10, a set of encryption information is retrieved for the user device 10. This is referenced as the encryption key, such as the commonly used advanced encryption standard (AES) encryption key. Additionally or alternatively, counter values can be implemented by asymmetric public/private keys.

At 703, the PEPS module 27 acquires the current vehicle location (coordinates) in latitude/longitude from the telematics module 26. The location can include error bounds based on the current measurement accuracy of the vehicle system. The PEPS module 27 then embeds the latitude and longitude of the vehicle 30 into a message and encrypts the challenge message at 704 using the security information retrieved at 702. The challenge data produced at 704 is transferred to the communication gateway 29 at 705. The communication gateway 29 then transmits, using BLE, at 706 to the user device 10.

An application executing on the user device 10 decrypts the challenge message at 707. The application executing on the user device 10 obtains the location and/or velocity data at 708 of the user device 10 in latitude and longitude, with optional location accuracy information. The application executing on the user device 10 obtains the movement data at 709 of the user device 10.

The application executing on the user device 10 then performs a mathematical operation at 710 on the location and/or velocity data received at 708, the movement data received at 709, and/or the coordinates of the vehicle 30 (sent at 703), as received from the communication gateway 29. The mathematical operation at 710 is known as the challenge response. An example of a mathematical operation at 710 can be to compute the distance between the two locations. Another example of the mathematical operation at 710 is to compute an exclusive or (XOR) of the two sets of locations (e.g., coordinates), recited at 703 and 708. Yet another example of the mathematical operation at 710 is to compute the bearing from the vehicle's location from 703 to the user device's location from 708. Once the value from the mathematical operation at 710 is obtained, the application executing on the user device 10 can then pack a message with the value of the mathematical operation at 710 as well as the location and/or velocity information from 708 and movement data at 709 and encrypt the packet at 711 using the key required to communicate with the communication gateway 29.

The user device 10 can then transmit at 712 the encrypted message from 710, using BLE, to the communication gateway 29. At 712, the communication gateway 29 receives the encrypted message from 710. At 713, the communication gateway 29 transfers the encrypted message from 710 to the PEPS module 27. At 714, the PEPS module 27 decrypts the encrypted message from 711 using the key appropriate for communication from user device 10. The PEPS module 27 then extracts the location and/or velocity data from 708 and the movement data from 709 and the user device's computed challenge response from 710, and computes the same mathematical operation on the location information from 703 and 708. The result of the operation is then compared to the purported challenge response contained in the encrypted message at step 715. The PEPS module 27 then compares the challenge response to acceptance criteria at 716. For example, the acceptance criteria could indicate that the value must be less than some threshold or within some bounds to be acceptable.

The present disclosure includes a system that includes a processor configured to execute instructions stored in a computer-readable medium. The instructions include determining whether movement data associated with a user device and location data associated with the user device indicates that the user device is approaching a first location. The instructions further include determining whether the location data matches the movement data and a measured signal strength associated with at least one sensor of a vehicle, wherein the measured signal strength indicates a signal strength of a communication link between the user device and a control module of a vehicle. The instructions further include determining that the user device is approaching the first location in response to a determination that the location data matches the movement data and the measured signal strength.

In other features, the instructions further include determining that the user device is not approaching the first location in response to a determination that the location data does not match the movement data and the measured signal strength.

In other features, the instructions further includes determining that the communication link is subjected to malicious interference in response to the determination that the location data does not match the measured signal strength.

In other features, the instructions further include determining a distance between the user device and the first location and activating a vehicle function in response to (i) the determination that the location data matches the movement data and the measured signal strength and (ii) the distance being less than a threshold distance.

In other features, the vehicle function includes at least one of unlocking a door of the vehicle and starting the vehicle.

In other features, the instructions further include receiving the movement data and the location data in response to the user device executing a cryptographic operation.

In other features, the movement data is configured to indicate a type of movement of a user of the user device.

In other features, the instructions the measured signal strength indicates one of a received signal strength (RSSI), a time difference of arrival, a time of arrival, and an angle of arrival.

In other features, the instructions further the user device includes the processor and the instructions include establishing the communication link with the control module of the vehicle via a communication gateway of the vehicle, generating the movement data based on measurements obtained from an accelerometer of the user device, and generating the location data based on measurements obtained from a global positioning system module of the user device.

In other features, the instructions further the control module of the vehicle includes the processor and the instructions include establishing the communication link with the user device via a communication gateway of the vehicle, receiving the movement data, wherein the movement data is based on measurements obtained from an accelerometer of the user device, and receiving the location data, wherein the location data is based on measurements obtained from a global positioning system module of the user device.

A method is provided and includes determining, using a processor that is configured to execute instructions stored in a computer-readable medium, whether movement data associated with a user device and location data associated with the user device indicates that the user device is approaching a first location. The method also includes determining, using the processor, whether the location data matches the movement data and a measured signal strength associated with at least one sensor of a vehicle, wherein the measured signal strength indicates a signal strength of a communication link between the user device and a control module of a vehicle. The method also includes determining, using the processor that the user device is approaching the first location in response to a determination that the location data matches the movement data and the measured signal strength.

In other features, the method further includes determining, using the processor, that the user device is not approaching the first location in response to a determination that the location data does not match the movement data and the measured signal strength.

In other features, the method further includes determining, using the processor, that the communication link is subjected to malicious interference in response to the determination that the location data does not match the measured signal strength.

In other features, the method further includes determining, using the processor, a distance between the user device and the first location and activating, using the processor, a vehicle function in response to (i) the determination that the location data matches the movement data and the measured signal strength and (ii) the distance being less than a threshold distance.

In other features, the vehicle function includes at least one of unlocking a door of the vehicle and starting the vehicle.

In other features, the method further includes receiving, using the processor, the movement data and the location data in response to the user device executing a cryptographic operation.

In other features, the movement data is configured to indicate a type of movement of a user of the user device.

In other features, the measured signal strength indicates one of a received signal strength (RSSI), a time difference of arrival, a time of arrival, and an angle of arrival.

In other features, the method further includes establishing, using the processor, the communication link with the control module of the vehicle via a communication gateway of the vehicle, wherein the user device includes the processor, generating, using the processor, the movement data based on measurements obtained from an accelerometer of the user device, and generating, using the processor, the location data based on measurements obtained from a global positioning system module of the user device.

In other features, the method further includes establishing, using the processor, the communication link with the user device via a communication gateway of the vehicle, wherein the control module of the vehicle includes the processor, receiving, using the processor, the movement data, wherein the movement data is based on measurements obtained from an accelerometer of the user device, and receiving, using the processor, the location data, wherein the location data is based on measurements obtained from a global positioning system module of the user device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
  a control module of a vehicle, the control module having a processor configured to execute instructions stored in a non-transitory computer-readable medium, wherein the instructions include:
    communicating with a user device over a communication link between the user device and the control module;
    receiving movement data from the user device over the communication link, the movement data being generated by an accelerometer of the user device and indicating whether the user device is moving;
    receiving location data from the user device over the communication link, the location data being generated by a global positioning system of the user device;
    generating signal strength data by measuring, with at least one sensor, a signal strength of communication signals communicated between the user device and the control module over the communication link;
    determining whether the movement data indicates that the user device is moving and whether the location data and the signal strength data each indicate that the user device is approaching the vehicle;
    determining a distance between the user device and the vehicle based on the signal strength data;
    activating a vehicle function of the vehicle in response to (i) determining that the movement data indicates that the user device is moving, (ii) determining that the location data indicates that the user device is approaching the vehicle, (iii) determining that the signal strength data indicates that the user device is approaching the vehicle, and (iv) determining that the distance is less than a threshold distance;
    determining that the user device is not approaching the vehicle in response to determining that at least one of (i) the movement data indicates that the user device is not moving, (ii) the location data does not indicate that the user device is approaching the vehicle, and (ii) the signal strength data does not indicate that the user device is approaching the vehicle;
    determining that the communication link is subject to malicious interference in response to determining that the movement data indicates that the user device is not moving and that at least one of the location data and the signal strength data indicates that the user device is approaching the vehicle; and
    generating a communication to the user device indicating that the communication link is subject to malicious interference and refraining from activating the vehicle function in response to determining that the communication link is subject to malicious interference.

2. The system of claim 1, wherein the vehicle function includes at least one of unlocking a door of the vehicle and starting the vehicle.

3. The system of claim 1, wherein the instructions further comprise receiving the movement data and the location data in response to the user device executing a cryptographic operation.

4. The system of claim 1, wherein the movement data is configured to indicate a type of movement of a user of the user device.

5. The system of claim 1, wherein the user device is configured to establish the communication link with the control module of the vehicle via a communication gateway of the vehicle.

6. The system of claim 1, wherein the instructions further include:
  establishing the communication link with the user device via a communication gateway of the vehicle.

7. A method comprising:
  communicating, using control module having a processor configured to execute instructions stored in a non-transitory computer-readable medium, with a user device over a communication link between the user device and the control module;
  receiving, with the control module, the movement data from the user device over the communication link, the movement data being generated by an accelerometer of the user device and indicating whether the user device is moving;
  receiving, with the control module, location data from the user device over the communication link, the location data being generated by a global positioning system of the user device;
  generating, with the control module, signal strength data by measuring, with at least one sensor, a signal strength of communication signals communicated between the user device and the control module over the communication link;
  determining, with the control module, whether the movement data indicates that the user device moving and whether the location data and the signal strength data each indicate that the user device is approaching the vehicle;
  determining, with the control module, a distance between the user device and the vehicle based on the signal strength data;
  activating, with the control module, a vehicle function of the vehicle in response to (i) determining that the movement data indicates that the user device is moving, (ii) determining that the location data indicates that the user device is approaching the vehicle, (iii) determining that the signal strength data indicates that the user device is approaching the vehicle, and (iv) determining that the distance is less than a threshold distance;
  determining, using the control module, that the user device is not approaching the vehicle in response to determining that at least one of (i) the movement data indicates that the user device is not moving, (ii) the location data does not indicate that the user device is approaching the vehicle, and (iii) the signal strength data does not indicate that the user device is approaching the vehicle;
  determining, using the control module, that the communication link is subject to malicious interference in response to determining that the movement data indicates that the user device is not moving and that at least one of the location data and the signal strength data indicates that the user device is approaching the vehicle; and
  generating, using the control module, a communication to the user device indicating that the communication link is subject to malicious interference and refraining, with the control module, from activating the vehicle function in response to determining that the communication link is subject to malicious interference.

8. The method of claim 1, wherein the vehicle function includes at least one of unlocking a door of the vehicle and starting the vehicle.

9. The method of claim 7, further comprising receiving, using the control module, the movement data and the location data in response to the user device executing a cryptographic operation.

10. The method of claim 7, wherein the movement data is configured to indicate a type of movement of a user of the user device.

11. The method of claim 7, wherein
the user device is configured to establish the communication link with the control module of the vehicle via a communication gateway of the vehicle.

12. The method of claim 7, further comprising:
establishing, using the control module, the communication link with the user device via a communication gateway of the vehicle.

* * * * *

UNITED STATES PATENT AND TRADEMARK OFFICE
CERTIFICATE OF CORRECTION

PATENT NO. : 10,864,888 B2
APPLICATION NO. : 16/786387
DATED : December 15, 2020
INVENTOR(S) : Kyle Golsch Page 1 of 1

It is certified that error appears in the above-identified patent and that said Letters Patent is hereby corrected as shown below:

In the Claims

Column 15, Line 44: In Claim 1, delete "(ii)" and insert --(iii)-- therefor

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*